A. F. W. BOWEN.
ERASER HOLDER FOR PENCILS.
APPLICATION FILED DEC. 28, 1905. RENEWED NOV. 3, 1914.
1,136,094.
Patented Apr. 20, 1915.
2 SHEETS—SHEET 1.
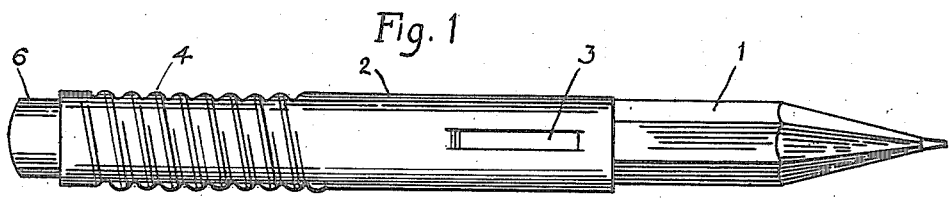
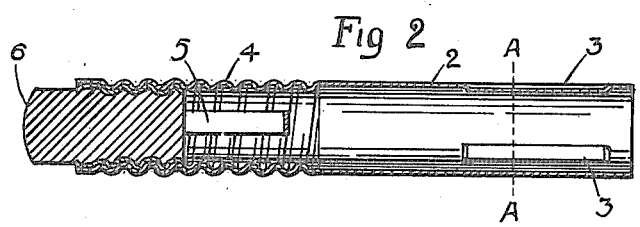
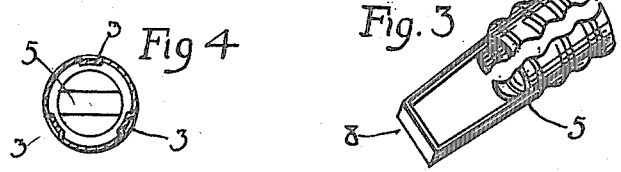
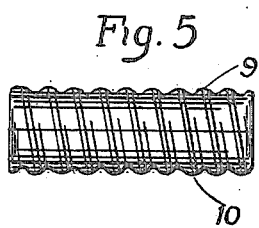
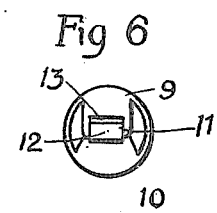
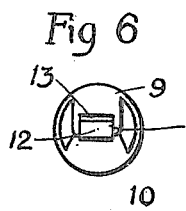
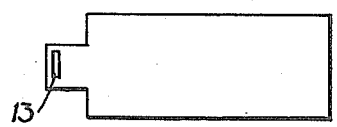

A. F. W. BOWEN.
ERASER HOLDER FOR PENCILS.
APPLICATION FILED DEC. 28, 1905. RENEWED NOV. 3, 1914.

1,136,094.

Patented Apr. 20, 1915.
2 SHEETS—SHEET 2.

WITNESSES:
K. Lockwood Nevins.
Bessie Gorfinkel

INVENTOR.
A. F. W. Bowen,
By
F. W. Wright,
ATTORNEY.

UNITED STATES PATENT OFFICE.

ANNIE F. W. BOWEN, OF SAN FRANCISCO, CALIFORNIA.

ERASER-HOLDER FOR PENCILS.

1,136,094.      Specification of Letters Patent.      Patented Apr. 20, 1915.

Application filed December 28, 1905, Serial No. 293,688. Renewed November 3, 1914. Serial No. 870,168.

*To all whom it may concern:*

Be it known that I, ANNIE FLORENCE W. BOWEN, a citizen of the United States, residing at San Francisco, in the county of San Francisco and State of California, have invented certain new and useful Improvements in Eraser-Holders for Pencils, of which the following is a specification.

This invention relates to an improved eraser holder for pencils, the object of the invention being to provide a cheap and simple device of this character, constructed so as to hold the eraser securely, to permit it to be adjusted to compensate for wear of the eraser, as well as to allow any desired portion thereof to project beyond the holder, and to enable it to be attached to any pencil of ordinary thickness.

Figure 9:
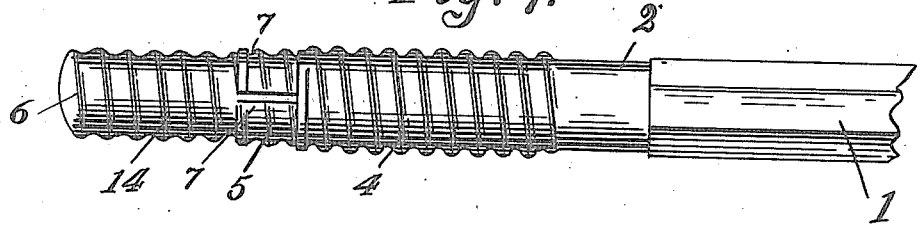
Figure 10:
Figure 11:
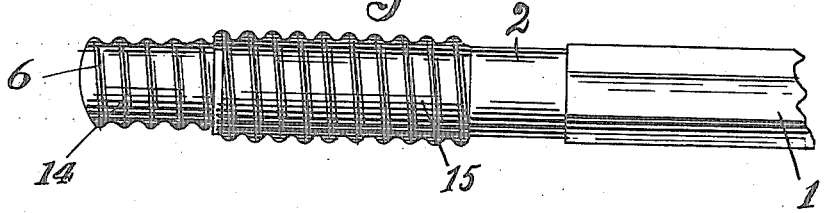
Figure 12:
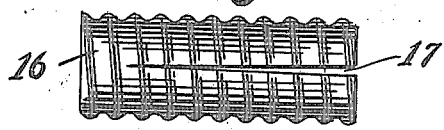
Figure 13:
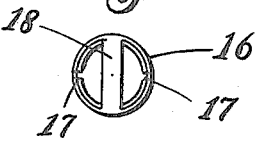
Figure 14:
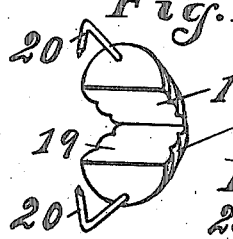
Figure 15:
Figure 16:
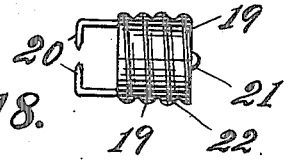
Figure 17:
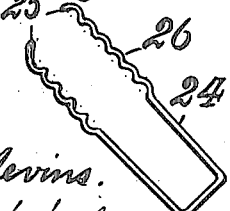
Figure 18:
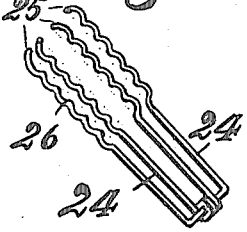

In the accompanying drawing, Figure 1 is a side elevation showing one form of my improved holder attached to a pencil; Fig. 2 is a longitudinal section of the holder detached from the pencil; Fig. 3 is a perspective view of the clamp for the eraser, detached; Fig. 4 is a cross section of the holder on the line A—A of Fig. 2; Fig. 5 is a side elevation of a modified form of clamp; Fig. 6 is an end view of the same; Fig. 7 is a plan view of one of the blanks for forming the clamp shown in Fig. 5; Fig. 8 is a plan view of the other blank therefor; Fig. 9 is a side view showing my improved holder with a modified form of eraser therein; Fig. 10 is a side view of the eraser detached; Fig. 11 is a side view of said modified form of eraser with another form of holder; Fig. 12 is a side view of a further modification of the clamp; Fig. 13 is an end view thereof; Fig. 14 is a perspective view of a further modification of the clamp; Fig. 15 is an end view thereof; Fig. 16 is a side view; Fig. 17 is a perspective view of a further modification of the clamp; Fig. 18 is a similar view of another modification.

Referring to the drawing, 1 represents the pencil, and 2 the eraser holder secured thereto by pressure of springs 3 formed by pressing inward slitted portions of the metal of the holder. The eraser holding end of the holder is pressed into the form of a screw thread as shown at 4, and within said screw threaded portion is screwed a clamp 5 for the eraser 6. Said clamp, shown in Figs. 1—4, is formed of a single piece of sheet metal having the two semi-cylindrical clamping jaws 7, and a yoke or bridge 8. Each jaw is formed with a thread, so that when the jaws are brought together, the thread thereof screws within the threaded portion 4 of the holder. The metal is sufficiently flexible to permit the jaws to be spread from each other to allow of the insertion of the eraser, whereupon the jaws are pressed around the eraser and are inserted into the threaded portion of the holder and screwed therein, when the pressure of said threaded portion upon the jaws securely holds said eraser in place. At the same time it is an easy matter to adjust the eraser, and for this purpose if necessary, the clamp can be taken out and the eraser shifted in position and the clamp then reinserted.

In the modification shown in Figs. 5 to 8, the threaded portion or jaws 9, 10 of the clamp are continued the whole length thereof, and are hinged together, as shown at 11, and in this case said jaws are conveniently made of sheet metal from blanks shown in Figs. 7 and 8, in which one of the blanks has a tongue 12 and the other an eye 13, so that by inserting said tongue in said eye and suitably bending the same, a hinge can be formed which holds the two clamping jaws together.

In Fig. 9 is shown a modified form of eraser in which it is molded with screw threads 14. This permits it to be screwed more easily into the clamp 5 and also to be held more firmly thereby. This modified form of eraser is shown in detail in Fig. 10, and in Fig. 11 it is shown that this form of eraser may be also used with a different form of holder, namely, one consisting of a tube 15 pressed into the form of a screw and secured to the end of the pencil. In use with this form of holder the eraser is merely screwed into the holder.

In the modification shown in Figs. 12 and 13, the clamp is made of a tube 16, threaded in the same manner as before, and having two or more slits 17 extending from one end to a point near the other end, said other end being securely braced by means of a bridge 18. In using this clamp, all that is necessary is to spread the two sides of the clamp sufficiently to permit the eraser to be inserted, insert the eraser in the clamp and then screw the clamp into the holder. The pressure of the holder upon the clamp then forces the two halves of the holder together and holds the eraser in place.

In the modification shown in Figs. 14, 15, and 16, the clamp comprises the two pivoted members 19, each provided with a hook 20, and hinged together as shown at 21, the hooks being adapted to enter opposite sides of the eraser, and the two members being threaded as shown at 22, to permit the same to be screwed into the holder.

In the modification shown in Fig. 17, a wire 24 is bent into a clamp to extend on opposite sides of the eraser. The ends of the wire are bent slightly inward to form hooks 25 to slightly compress the eraser, and the sides of the clamp are wavy as shown at 26 so that said sides would fit in the threads of the holder. In Fig. 18 two such wires 24 are so bent, forming four sides.

I claim:—

An eraser holding device comprising a sheet-metal sleeve adapted to be secured at one end upon an end of a pencil, and having the remaining portion internally screw-threaded, a rubber eraser of less diameter than the sleeve, and an externally screw-threaded holder secured about one end of said rubber eraser, said holder being adapted to be screwed into the metal sleeve, the number of threads on said holder being less than the number of threads within the sleeve, whereby the holder may be withdrawn entirely within the sleeve and the rubber eraser permitted to project beyond the end of the sleeve.

In witness whereof I have hereunto set my hand in the presence of two subscribing witnesses.

ANNIE F. W. BOWEN.

Witnesses:
BESSIE GORFINKEL,
ANNIE PETERSON.